United States Patent [19]
Lovitz

[11] 3,717,253
[45] Feb. 20, 1973

[54] ADJUSTABLE BRACKET AND FILTER FOR VARIOUS SIZES OF HOME AQUARIUMS

[75] Inventor: David D. Lovitz, Short Hills, N.J.

[73] Assignee: Sternco Industries, Inc., Harrison, N.J.

[22] Filed: Dec. 22, 1971

[21] Appl. No.: 210,839

[52] U.S. Cl. ................................................210/169
[51] Int. Cl. ...............................................E04h 3/20
[58] Field of Search............................210/169, 474

[56] References Cited

UNITED STATES PATENTS

| | | | |
|---|---|---|---|
| 3,477,679 | 11/1969 | Lovitz | 210/169 X |
| 3,643,801 | 2/1972 | Zelenko | 210/169 |
| 2,717,561 | 9/1955 | Bearden | 210/474 |
| 3,006,476 | 10/1961 | Halpert | 210/169 |
| 3,160,588 | 12/1964 | Alarle | 210/169 UX |

*Primary Examiner*—Reuben Friedman
*Assistant Examiner*—T. A. Granger
*Attorney*—Emanuel R. Posnack

[57] ABSTRACT

A combination adjustable bracket and filter casing for suspension within aquarium tanks of different sizes. The bracket comprises upper and lower sections which are permanently connected when in assembled relation. The rear of the casing has a pair of channel elements and therebetween a wedge lock element, the bracket having a plurality of laterally opposite pairs of slide sections with bottom stops, said slide sections being slidably interengageable with said pair of channel elements, the casing being held by said stops in the selected operative position. The bracket has a plurality of vertically aligned apertured portions each being positioned for locking engagement with said wedge lock element when the corresponding pair of slide sections is in the said selected operative position, whereby the casing is held locked on said bracket. An air pipe is supported by said bracket and is adapted to extend through a selected one of the bracket's apertured portions for operative connection to the filter casing.

6 Claims, 13 Drawing Figures

PATENTED FEB 20 1973  3,717,253

FIG. 3
FIG. 4
FIG. 5
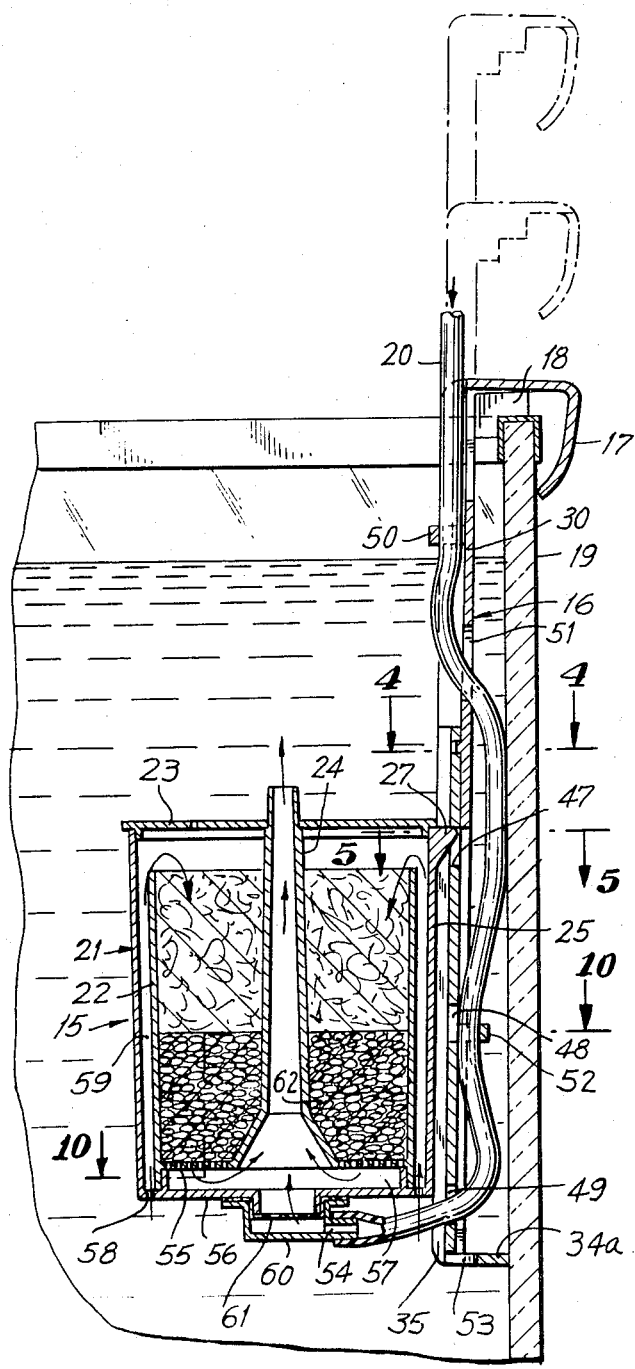
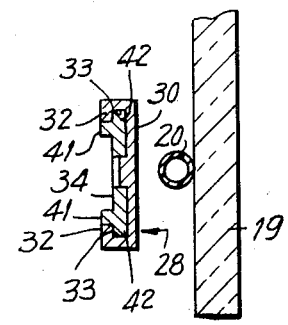
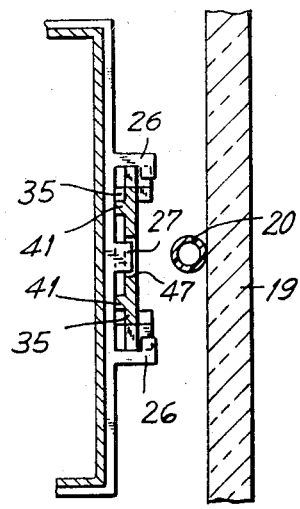

FIG. 6
FIG. 7
FIG. 8
FIG. 9
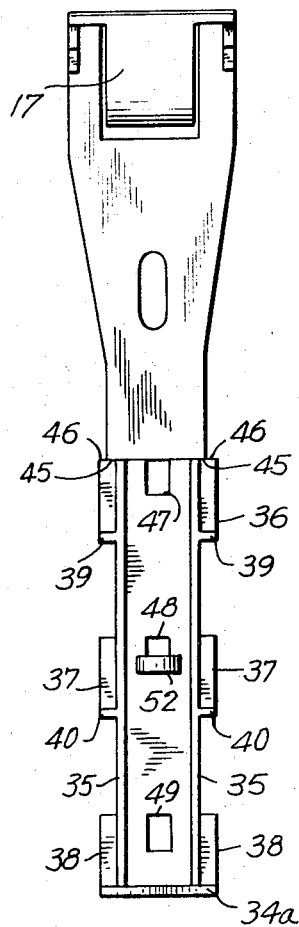
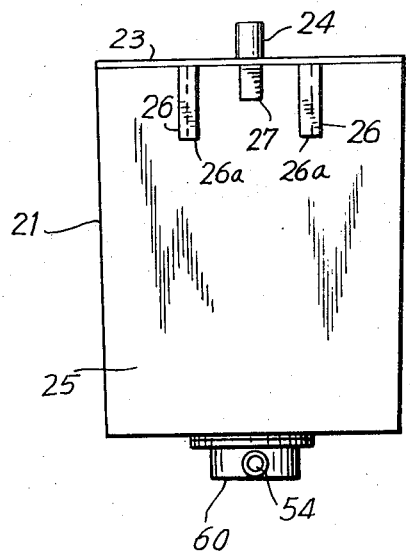
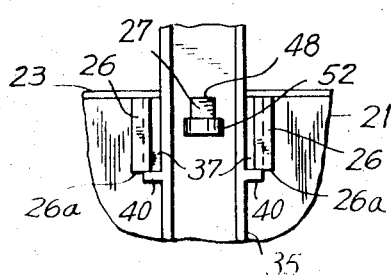
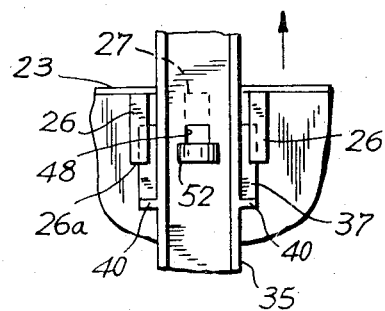

ADJUSTABLE BRACKET AND FILTER FOR VARIOUS SIZES OF HOME AQUARIUMS

THE FIELD OF THE INVENTION

This invention relates to filter devices for use in home aquariums, and is particularly directed to devices of this category having a separable filter member and adapted for removable suspension within aquarium tanks of different sizes.

THE KNOWN ART

There are filter devices adapted for suspension from the walls of aquarium tanks, but these are generally of fixed proportions useable only with tanks of one size and adapted for positioning at one predetermined level within the tank. The known adjustable hangers are not suited for filter devices, and are not adapted for widespread commercial use generally because the range of adjustments is extremely limited; and where attempts have been made to increase the range of adjustments, the resulting brackets have been cumbersome and impracticable for economical shipping and storing. In view of these difficulties, manufacturers and distributors of aquarium products are often required to stock various sizes of filter devices of the said category; and owners of home aquariums are at times required to purchase different sizes of hanger-supported filters for use at different optimum levels within a tank.

THE OBJECTS OF THE INVENTION

It is an objective of this invention to provide an effective filter device of the above-described category having none of the aforesaid shortcomings. Specifically, among the objects of this invention are the provision of a hanger-supported filter device (1) which is adjustable for use with different sizes of home aquarium tanks and at different levels within a tank, (2) which comprises separate interconnectable parts for economical shipment and storage, (3) which can readily be manually adjusted without the use of special tools and without the need to have special mechanical skills, (4) which will be firmly held in selected assembled relation without displacement of the adjustable components, (5) which can be readjusted by a single manual manipulation, (6) which will permit the lower terminal portion of the air inlet tubing to be positioned at different points on the supporting bracket for ready and most suitable attachment to the filter casing, (7) which will enable the filter-containing basket to be removed for replacing filter material without wetting the hands, and (8) which is of simple and inexpensive construction.

Other objects, features and advantages will appear from the drawings and the description hereafter given.

SUMMARY OF THE INVENTION

In the preferred embodiment of the invention, a filter casing having therein a removable filter-containing basket is removably connected to a bracket adapted to be suspended from the rim of an aquarium tank along an inside wall thereof. The bracket comprises two components, an upper and a lower section, the two being permanently connected when in operatively assembled relation. The casing has at the upper rear wall thereof a pair of channel elements and therebetween a wedge lock element, the lower bracket section having a vertical wall flanked by two opposite vertical rails each having a plurality of vertically aligned outwardly extending slide sections provided at their respective bottom ends with short rearwardly extending legs or stops, the slide sections being arranged in pairs at said opposite rails, the said vertical wall having a plurality of vertically aligned apertured portions and at the bottom thereof a rearwardly extending apertured base.

In attaching said casing to a selected portion of the bracket for use with an aquarium tank of a selected size, said rails of the bracket are brought into slidable engagement with the rear of the casing, the casing being moved vertically downwardly along the rails to bring said channel elements into slidable interengagement with the selected pair of slide sections, the movement continuing until the bottoms of said pair of channel elements engage the said legs of the selected pair of slide sections, at which point said wedge lock element snaps into the adjacent apertured portion for locking engagement with said vertical wall, whereby the casing is held locked to the bracket at the desired level.

An air pipe, adapted for use with the filter casing in known manner, is slidably supported by front and rear loops on the bracket, there being a passageway near the top of the bracket adapted to receive therethrough an upper portion of the pipe, the lower portion of the pipe being adapted to extend either through one of said apertured portions of the bracket's wall or through the aperture in the bracket's said base, the selected aperture depending upon the position of said casing on the bracket.

The entire assembly is suspended from the rim of an aquarium in known manner. The filter member in the casing can readily be removed for replacement while the bracket-filter assembly is mounted on the aquarium rim, or the assembly can be lifted off the rim for such replacement while the casing's position on the bracket is firmly maintained.

DESCRIPTION OF THE DRAWINGS

FIG. 3 is a vertical medial section of the device of FIG. 2, the dot-dash lines showing two other possible positions of the adjustable bracket with respect to the filter member.

FIG. 4 is a fragmentary section of FIG. 3 taken along line 4—4.

FIG. 5 is a fragmentary section of FIG. 3 taken along line 5—5.

FIG. 6 is a rear view of the bracket member of this invention.

FIG. 7 is a rear view of the filter casing member of this invention.

FIG. 8 is a fragmentary rear view of the bracket with the casing attached thereto in operative position.

3

FIG. 9 is a view like FIG. 8 showing an intermediate position of the casing while being moved into operative position.

Figure 10:
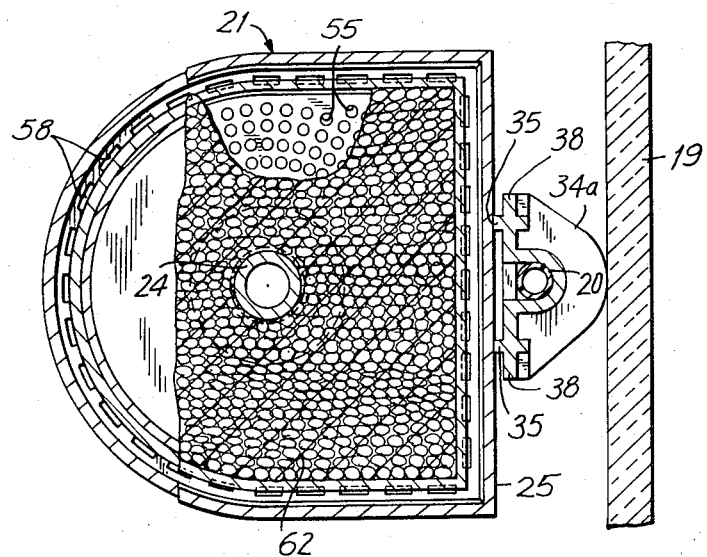

FIG. 10 is a section of FIG. 3 taken substantially along line 10—10.

Figure 11:
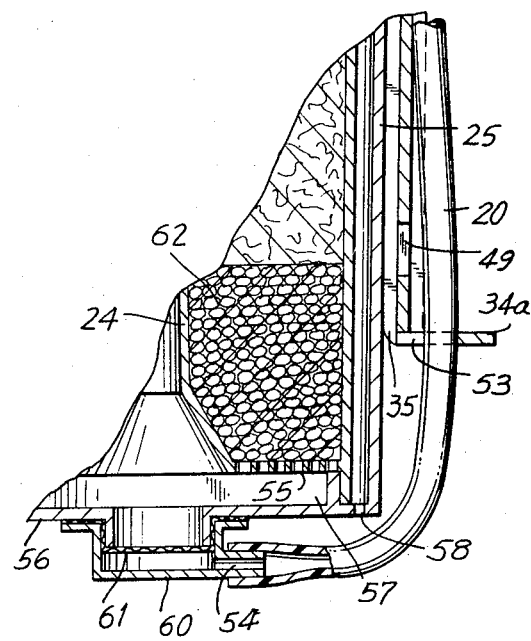

FIG. 11 is a fragmentary enlarged section substantially like FIG. 3 but showing a different position of the filter casing on the bracket.

Figure 1:
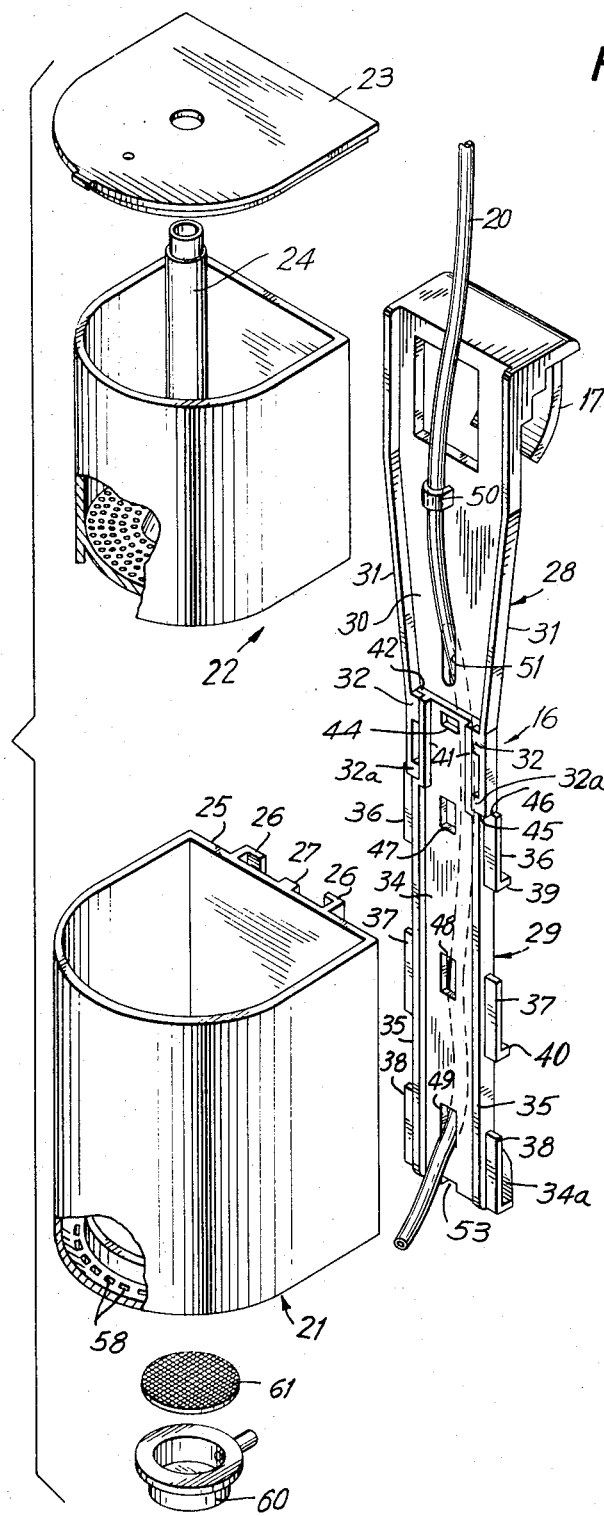
FIG. 1 is an exploded perspective view of the components of an embodiment of this invention, the two sections of the bracket being shown in assembled relation.
Figure 1A:
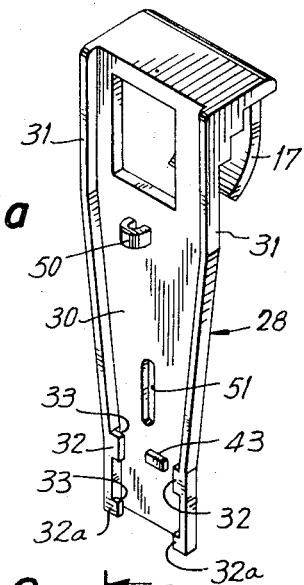
FIG. 1a is a perspective view of the upper bracket section.
Figure 2:
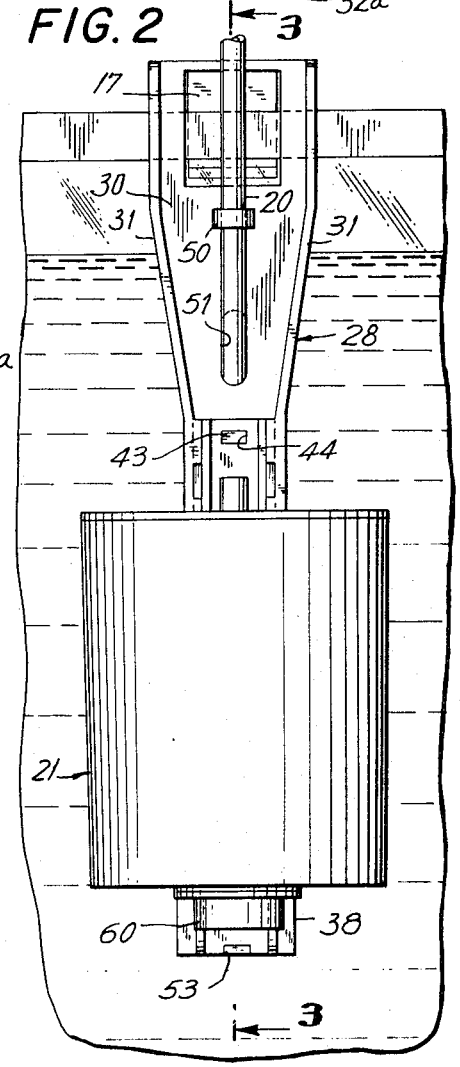
FIG. 2 is a front view of the invention in assembled relation showing a portion of the aquarium tank from the rim of which the bracket is suspended.
Figure 12:
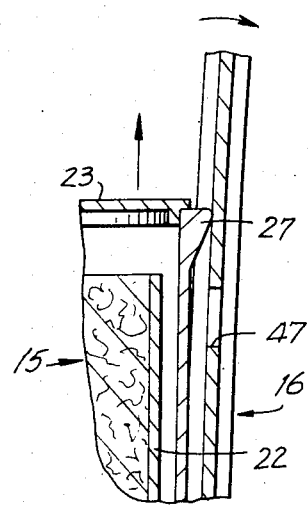

FIG. 12 is a fragmentary vertical medial section of the casing and bracket showing the position of the parts while being disengaged.

DESCRIPTION OF THE PREFERRED EMBODIMENT

In the particular embodiment of this invention illustrated, the filter member 15 is mounted on the bracket 16 which is adapted to be suspended by its hook 17 from the rim 18 of the aquarium tank 19, the main body portion and the filter member being disposed within the tank. The pipe 20, carried by the bracket, is connected to an outside pump (not shown), the lower portion of the pipe being connected to the bottom of the filter member 15 in a manner to be hereinbelow described.

The said filter member comprises the casing 21 having therein the conventional filter basket 22, the cover 23 and the discharge pipe 24, the rear wall 25 of the casing being preferably flat and having at the upper portion thereof the rearwardly extending pair of short channel elements 26 and therebetween the wedge lock element 27.

The said bracket 16 comprises the interlocked upper section 28 and the lower section 29—these being separate parts for economy in shipping and storing. Said upper section 28 has the vertical wall 30 flanked by the two forwardly extending marginal walls 31, 31 having at the lower forward portions thereof the two pairs of inwardly extending flanges 32—32 and 32a—32a leaving the vertically aligned recessed portions 33 between said flanges and said wall 30.

The said lower bracket section 29 comprises the vertical wall 34 flanked by the two opposite vertical rails 35—35, each having extending laterally outwardly therefrom the vertically aligned slide sections 36, 37 and 38, said slide sections being arranged in pairs at said opposite rails, said pairs being designated 36—36, 37—37, 38—38, the bottoms of said slide sections 36 and 37 being provided, respectively with the short rearwardly extending legs or stops 39 and 40, the bottoms of said slide sections 38 being joined to the rearwardly extending apertured base 34a which also serves as a stop member.

The upper portion of said lower bracket section 29 has the pair of forwardly extending vertical ribs 41 and the outwardly extending vertical flanges 42, these being proportioned to fit within said recessed portions 33 of the upper bracket section 28, said flanges 42 and ribs 41 being adapted for slidable engagement with the said flanges 32—32 and 32a—32a of said upper section. The wall 30 of the said upper bracket section 28 has the wedge element 43 proportioned and positioned to snap into the apertured portion 44 at the upper portion of the wall 34 of the lower bracket section at a predetermined locking position, this position being established, in the particular embodiment illustrated, by the engagement of lower edges 45—45 of the respective marginal walls 31—31 of the upper bracket section 28 and the upper edges 46—46 of the slides 36—36 of the lower section 29. Once the two sections 28 and 29 are thus assembled they are operatively locked together and constitute a unitary bracket.

The said wall 34 of the lower bracket section has therein the vertically aligned apertured portions 47, 48 and 49, these being disposed in predetermined operative positions relative to the respective corresponding slide sections 36—36, 37—37 and 38—38 so that the said wedge lock element 27 will snap into locking position within a selected one of said apertured portions in coactive relation to the operative action of the corresponding stop elements 39—39, 40—40 or 34a, all as will be explained below. The wall 30 of the said upper bracket section 28 contains the forwardly extending loop 50 and the passageway 51, the said air supply pipe 20 extending downwardly through said loop 50 and rearwardly through said passageway 51, whereafter it extends downwardly behind the lower bracket section 29 through the rearwardly extending loop 52. The lower terminal portion of pipe 20 can then be drawn through one of the said apertured portions of wall 34 or through the aperture 53 in the base 34a of the lower bracket section 29, depending upon the position of the filter member 15 on the bracket 16. For example, when the filter member is positioned on the bracket as indicated in FIG. 3, the pipe 20 extends through the apertured portion 49 for operative engagement with the filter air inlet 54 at the base of the filter casing 21. FIG. 11 shows the filter member 15 at a lower position on the bracket, the pipe 20 now extending through the aperture 53 in said base 34a. The air pipe can thus be effectively employed with the least amount of distortion. It is noteworthy that the said apertured portion 49 of said wall 34 serves a double function—as a locking element coacting with said wedge lock element 27 and as a passageway for the air pipe; and the apertured base 34a also serves a double function, as a limiting stop for the casing at the bottom of the slide sections 38 and as a passageway for said air pipe.

In the operation of assembling the filter member 15 to the bracket 16, it is first required to select the particular pair of slide sections on the bracket to which it is desired to attach the casing 21—a consideration depending upon the size of the aquarium tank. The rear wall 25 of the casing is placed against the rails 35—35 of the bracket with the channel elements 26—26 above the selected slide sections, whereafter the casing is slid down along the rails with said channel elements in slidable engagement with the slide sections, the movement continuing until the bottom edges 26a—26a engage the stop elements (39, 40 or 34a) at the bottom of the slide sections. At this point the wedge lock element 27 will snap into the corresponding apertured portion on the wall 34, whereby the casing 21 will be held locked against movement relative to the bracket—the stop elements preventing downward movement, the wedge lock element preventing upward movement, the interengagement of the channel elements 26—26 with the slide sections preventing lateral and forward and rearward displacement. FIGS. 8 and 9 show the channel elements 26—26 in operative engagement with the slide sections 37—37, the bottom edges 26a—26a of the channel elements being in engagement with the stop elements 40—40 and the wedge lock element 27 being in engagement with the apertured portion 48. FIG. 3 shows the wedge stop element 27 in engagement with the apertured portion 47.

It is noteworthy that the connection between the upper and lower bracket sections does not interfere with the slidable engagement of the filter casing over the top pair of slide elements 36—36, this being due to the fact that flanges 32—32 and 32a—32a are positioned inwardly of the marginal walls 31—31 of the upper bracket section, and the upper slide elements 36—36 extend laterally outwardly beyond the sides of the upper section 28—leaving said top pair of slide elements 36—36 free and clear for operative engagement with said channel elements 26—26 of the filter casing.

Should it be desired to separate the filter member from the bracket 16, the bracket—which for such a situation should be slightly resilient—could be flexed rearwardly as indicated in FIG. 12 to disengage the wedge stop element 27, whereafter the filter member 15 is slid upwardly above the slide sections and then separated from the bracket.

The filter member is operable in a manner known to those skilled in the art. The basket 22 containing filter material 62 has a perforated floor 55 spaced above the floor 56 of the casing to form the laterally enclosed compartment 57, the floor 56 having peripheral holes 58 communicating with the space 59 between the lateral walls of the basket 22 and casing 21. The air inlet fitting 54 communicates with the filter cap 60 supporting the mesh screen 61. Air enters the compartment 57 and travels upwardly through the discharge conduit 24, the partial vacuum produced in the basket by such fluid movement drawing water from the aquarium up through the holes 58, up through said space 59 and then down through the filter material 62 and the perforations in the floor 55—the filtered water traveling up with the air through the said conduit 24, returning into the aquarium tank in purified and aerated condition.

In the above description, the invention has been disclosed merely by way of example and in preferred manner; but obviously many variations and modifications may be made therein. It is to be understood, therefore, that the invention is not limited to any particular form or manner of practicing same.

I claim:

1. An adjustable bracket and filter for use on an aquarium tank, the bracket having a vertical wall containing a plurality of vertically aligned outwardly extending slide sections arranged in pairs at laterally opposite sides of said bracket wall, said filter having a casing containing therein air filtering means, the rear of said casing having channel means positioned and proportioned for slidable engagement with selected ones of said slide sections, said channel means comprising two spaced channel elements proportioned for slidable engagement with selected pairs of said slide sections, and complementary stop means and locking means on said bracket and casing for operative engagement at a predetermined engaging position of said channel means and the selected ones of said slide sections, whereby said casing will be operatively held on said bracket at the level of said predetermined engaging position, said casing having at the rear thereof a rearwardly extending wedge lock element positioned between said channel elements, said vertical wall of the bracket having therein a plurality of vertically aligned apertured portions corresponding in number and position to said pairs of slide sections, each of said apertured portions being proportioned and positioned for locking engagement with said wedge lock element when the corresponding pair of slide sections is at the said predetermined engaging position, said wedge lock element and apertured portions constituting said complementary locking means.

2. An adjustable bracket and filter for use on an aquarium tank according to claim 1, said slide sections having at the respective bottom portions thereof rearwardly extending stop elements, the bottom ends of said channel elements being engageable with said stop elements of the selected pair, said stop elements of said bracket and said bottom ends of said channel elements constituting said stop means, the said vertical wall of said bracket being flanked by two laterally opposite vertical rails proportioned for slidable engagement with the rear of said casing when said channel elements are in operative slidable engagement with a selected pair of said slide sections.

3. An adjustable bracket and filter for use on an aquarium tank according to claim 2, said pairs of slide sections extending outwardly from said respective rails.

4. An adjustable bracket and filter for use on an aquarium tank according to claim 1, said bracket having forwardly and rearwardly extending loops and a passageway communicating between the front and rear of the bracket, and an air feed pipe extending through said loops and said passageway, one of said apertured portions in the said vertical wall of the bracket being proportioned to permit the passage therethrough of said pipe, said casing having at the bottom thereof an air inlet fitting, said pipe being proportioned for connection to said inlet fitting.

5. An adjustable bracket and filter for use on an aquarium tank according to claim 4, said bracket having at the bottom thereof a rearwardly extending base constituting the lowermost of said stop elements, said base having an aperture therein, said aperture being proportioned to permit the passage therethrough of said pipe.

6. An adjustable bracket and filter for use on an aquarium tank, the bracket having a vertical wall containing a plurality of vertically aligned outwardly extending slide sections, said filter having a casing containing therein air filtering means, the rear of said casing having channel means positioned and proportioned for slidable engagement with selected ones of said slide sections, and complementary stop means and locking means on said bracket and casing for operative engagement at a predetermined engaging position of said channel means and the selected ones of said slide sections, whereby said casing will be operatively held on said bracket at the level of said predetermined engaging position, said bracket comprising interconnected upper and lower sections, said upper section having at the lower portion thereof two laterally opposite inwardly extending flanges providing laterally opposite recessed portions between said respective flanges and the body of said upper section, the upper portion of said lower section having two spaced vertical ribs and extending laterally outwardly therefrom two vertical lateral flanges, said latter flanges being disposed within said recessed portions, said ribs and said latter flanges being in slidable engagement with said respective inwardly extending flanges of said upper section, and locking means holding said upper and lower sections in fixed relation, at least the uppermost of said slide sections extending laterally outwardly beyond the lateral sides of said upper section, whereby the said channel means of said casing will be free for slidable engagement with the said uppermost of said slide sections.

* * * * *